United States Patent
Fairholm et al.

[19]

[11] Patent Number: 5,907,541
[45] Date of Patent: May 25, 1999

[54] ARCHITECTURE FOR AN INTEGRATED MOBILE AND FIXED TELECOMMUNICATIONS SYSTEM INCLUDING A SPACECRAFT

[75] Inventors: Daniel Wayne Fairholm, Ashburn, Va.; Dennis Clifton Whitaker, Newtown Square, Pa.

[73] Assignee: Lockheed Martin Corp., Sunnyvale, Calif.

[21] Appl. No.: 08/957,753

[22] Filed: Oct. 20, 1997

Related U.S. Application Data

[60] Provisional application No. 60/059,310, Sep. 17, 1997.

[51] Int. Cl.[6] ......................................................... H04B 7/185
[52] U.S. Cl. ............................ 370/316; 370/321; 455/427
[58] Field of Search ..................................... 370/321, 322, 370/323, 325, 330, 436, 478; 455/427, 428, 429, 430, 450, 454, 553

[56] References Cited

U.S. PATENT DOCUMENTS

| | | | |
|---|---|---|---|
| 5,274,626 | 12/1993 | Hotta et al. | 370/31 |
| 5,600,707 | 2/1997 | Miller, II | 379/59 |
| 5,640,386 | 6/1997 | Wiedeman | 370/320 |
| 5,717,686 | 2/1998 | Schiavoni | 370/321 |

*Primary Examiner*—Huy D. Vu
*Assistant Examiner*—Alexander Boakye
*Attorney, Agent, or Firm*—W. H. Meise; R. P. Kennedy

[57] ABSTRACT

A communication system (10) includes a plurality of fixed terrestrial gateway terminals (14) and fixed village terminals (18), and also includes a plurality of mobile user terminals (16). The system includes a first satellite (12m) which provides communication in a bent-pipe manner between user terminals (16) lying in spot-beams of the first satellite's antenna and gateway terminals (18) lying in a broad antenna beam. The system also includes a second satellite which provides communications in a bent-pipe manner between or among the gateways/village terminals. The village terminals differ from the gateways in that the village terminals do not include the subscriber of user home or visitor registers. The village terminal includes a wireless local communication system such as a WLL, for communicating with user terminals (16) lying within its range. The user terminals (16) are dual-mode. In a first operating mode, the user terminals (16) communicate with other users by way of the village terminal when within its range, and otherwise switch to a second mode, in which they communicate by way of the first satellite. The village terminal communicates with gateways by means of the second spacecraft.

3 Claims, 5 Drawing Sheets

ARCHITECTURE FOR AN INTEGRATED
MOBILE AND FIXED
TELECOMMUNICATIONS SYSTEM
INCLUDING A SPACECRAFT

This is a continuation of Provisional Patent Application Ser. No. 60/059,310 filed Sep. 17, 1997 and entitled, "*Architecture for An Integrated Mobile and Fixed Communications System Including a Spacecraft.*"

FIELD OF THE INVENTION

This invention relates to spacecraft-based communication systems, and particularly to such systems which provide telephone and like services to both urban regions and relatively sparsely inhabited regions.

BACKGROUND OF THE INVENTION

Allowed U.S. patent application Ser. No. 08/784,873, filed Jan. 16, 1997 in the name of Hatzipapafotiou, Ser. No. 08/786,599, filed Jan. 21, 1997 in the name of Schiavoni, and U.S. patent application Ser No. 08/916,600, filed Aug. 22, 1997 in the name of Hudson, describe spacecraft- or satellite-based communication systems (the ACES system, for example) which are compatible with GSM-style land-based cellular systems, but which solve problems which are unique to spacecraft-based systems. The GSM system is described in detail in the text *The GSM System for Mobile Communications,* subtitled *A Comprehensive Overview of the European Digital Cellular System,* authored by Michel Mouly and Marie-Bernadette Pautet, and published in 1992 by the authors, at 4, rue Elisée Reclus, F-91120 Palaiseau, France. Another text describing the GSM system is *Mobile Radio Communications,* by Raymond Steele, published 1992 by Pentech Press, London, ISBN 0-7273-1406-8. Spacecraft-based systems such as ACES provide communications between terrestrial terminals or stations, some of which are principally mobile user terminals, and others of which are fixed gateway terminals. The gateway terminals provide connections between the spacecraft-based communication systems and land-based public switched telephone systems or public land mobile networks. The necessity for a plurality of such gateway terminals in a large-scale ACES-type system arises from the fact that it may not be economically feasible to interconnect all the land-based networks as would be required if only one gateway terminal were provided in the communication system; for example, if the eastern portion of the Asian continent is to be provided with service, it may be cheaper to provide a gateway terminal on each of the major islands, such as Sumatra, Borneo, Luzon, and Mindanao, than to provide an underwater cable which would connect the land systems of the various islands to the continent's land-based system.

In the system as described in the abovementioned Schiavoni and Hatzipapafotiou patent applications, mobile subscribers always lie within a spot beam of the spacecraft antenna, and can always be accessed for communication with any of the gateways. The ACES system provides service principally between user terminals and gateways, although it also provides for user-terminal-to-user-terminal communication under some conditions. Improved spacecraft-based communication systems are desired.

SUMMARY OF THE INVENTION

A spacecraft-based cellular frequency- and time-division multiple access communication system provides communication among terrestrial user or subscriber terminals, terrestrial gateway terminals, and terrestrial village terminals. The communication system comprises a satellite-based first transceiver arrangement. The first transceiver arrangement includes a first frequency-dependent routing arrangement, a first transmitting arrangement, a first receiving arrangement, and an antenna arrangement coupled to the transmitting and receiving arrangements. The antenna arrangement includes a first antenna which forms a plurality of spot beams directed toward the Earth's surface, each in a different direction, so that each beam overlies a different terrestrial footprint, and a second antenna which produces at least one broad beam directed toward the Earth's surface. The first transceiver arrangement is at least for (a) receiving, over the broad beam, forward traffic signals transmitted within a first uplink frequency band from at least one of the gateway terminals, and for frequency shifting the forward traffic signals to a first downlink frequency band, and for retransmitting the forward traffic signals in the first downlink frequency band over at least one of the spot beams to at least some of the user terminals lying within the footprint of the one of the spot beams, and for (b) receiving, over at least one of the spot beams, return traffic signals transmitted within a second uplink frequency band from at least one of the user terminals lying in the footprint associated with that one of the spot beams, and for frequency shifting the return traffic signals to a second downlink frequency band, and for retransmitting the return traffic signals in the second downlink frequency band over the broad beam to at least some of the gateway terminals lying within the footprint of the broad beam. As a consequence, the first transceiver operates in a bent-pipe manner to provide communications between the user terminals on the one hand and the gateway terminals on the other hand.

The communication system also includes a satellite-based second transceiver arrangement. The second transceiver arrangement operates in a bent-pipe manner for providing communications among the village and gateway terminals, and does not provide communication directly with the user terminals. The communication system includes at least one terrestrial gateway terminal, which includes subscriber home and visitor location registers, for storing information about communication system subscribers. Each of the gateway terminals is coupled to at least one public network, which may be one of a public switched telephone network and a public land mobile network. Each gateway terminal provides communication, by way of the second transceiver arrangement, between the public network and others of the gateway terminals and the village terminals. The communication system also includes at least one terrestrial village terminal. The village terminal provides communication by way of the second transceiver arrangement with at least one of the gateway terminals and other village terminals. The village terminal differs from the gateway terminals in that it lacks the subscriber home location register and the subscriber visitor location register. A further distinguishing characteristic of a village terminal according to an aspect of the invention is that it includes at least one cell of a wireless land-based cellular communication system having a limited effective range. The cell or cells of village terminal wireless system is for providing communications among those of the user terminals within the effective range of the cell of the village terminal, and, by way of the second transceiver arrangement, between at least one of the gateway terminals and those of the user terminals within the effective range of the cell of the village terminal. The communication system also includes at least one terrestrial dual-operating-mode user terminal. When the dual-operating-mode user terminal is within the effective range of the cell of the village terminal, the user terminal operates in a first mode, by which communications are made between the dual-operating-mode user terminal and the village terminal, and, when the dual-operating-mode user terminal is not within range of any village terminal, operating in a second mode, by which the dual-operating-mode user terminal communicates with the first transponder arrangement. As a result, in the first mode, the dual-operating-mode user terminal may communicate with others of the user terminals by way of the village terminal, and in the second mode, the dual-operating-mode user terminal communicates with others of the user terminals by way of at least the first transceiver, and whereby, in the first mode, the dual-operating-mode user terminal communicates with the gateway terminals by way of the village terminal and the second transceiver, and in the second mode of operation, the dual-operating-mode user terminal communicates with one of the gateway terminals by way of the first transceiver.

In a particular embodiment of the invention, the communication system has the first and second transceivers located on first and second satellites, respectively. The preferred orbit of the satellite(s) is geosynchronous.

DESCRIPTION OF THE INVENTION

The invention is based on the recognition that the lowest-cost arrangement for providing communication service over a large area may be achieved by a system which combines the benefits of a spacecraft-based system such as ACES, which includes gateway terminals and user terminals, which are principally mobile, with "village" terminals. The village terminals are located in remote areas which are sparsely populated, and which are too expensive to connect to a conventional public switched telephone network. The village terminals differ from gateway terminals in two principal ways; the village terminals provide land-based wireless service to user terminals within range of the village terminal, and, for low cost, they lack the sophisticated control capabilities of a gateway terminal.

More particularly, the village terminals used with a communication system according to the invention provide land-based wireless service in an associated region. The land-based wireless service may itself be a land-based cellular system with a plurality of cells, corresponding to a GSM system, or it may be a simple system having a single "cell," and thus not a cellular system at all. In this manner, traffic between user terminals within the range of the village terminal are handled by the village terminal itself, without involving the spacecraft-based system, which has the advantage of providing the possibility of improved call quality for communication among user terminals within range of the same village terminal, over the signal-to-noise ratio and delay which would occur if the communication between those user terminals were required to traverse the spacecraft repeater. Another advantage of wireless use of the village terminal for nearby user terminals is that the local traffic which is handled by the village terminal need not be handled by the spacecraft system, and therefore the communication system as a whole can accommodate a greater number of user terminals without saturation.

According to a further aspect of the invention, the user terminals are capable of operation in two modes. In the first mode, the user terminal recognizes its presence within range of the village terminal, and communicates therewith when accessing other users. In the remote regions contemplated, the user terminal may occasionally wander outside of the range of the village terminal. In a second mode of operation of dual-mode user terminals, the lack of availability of a village terminal is recognized, and communications are made directly with the spacecraft repeater.

Figure 1:
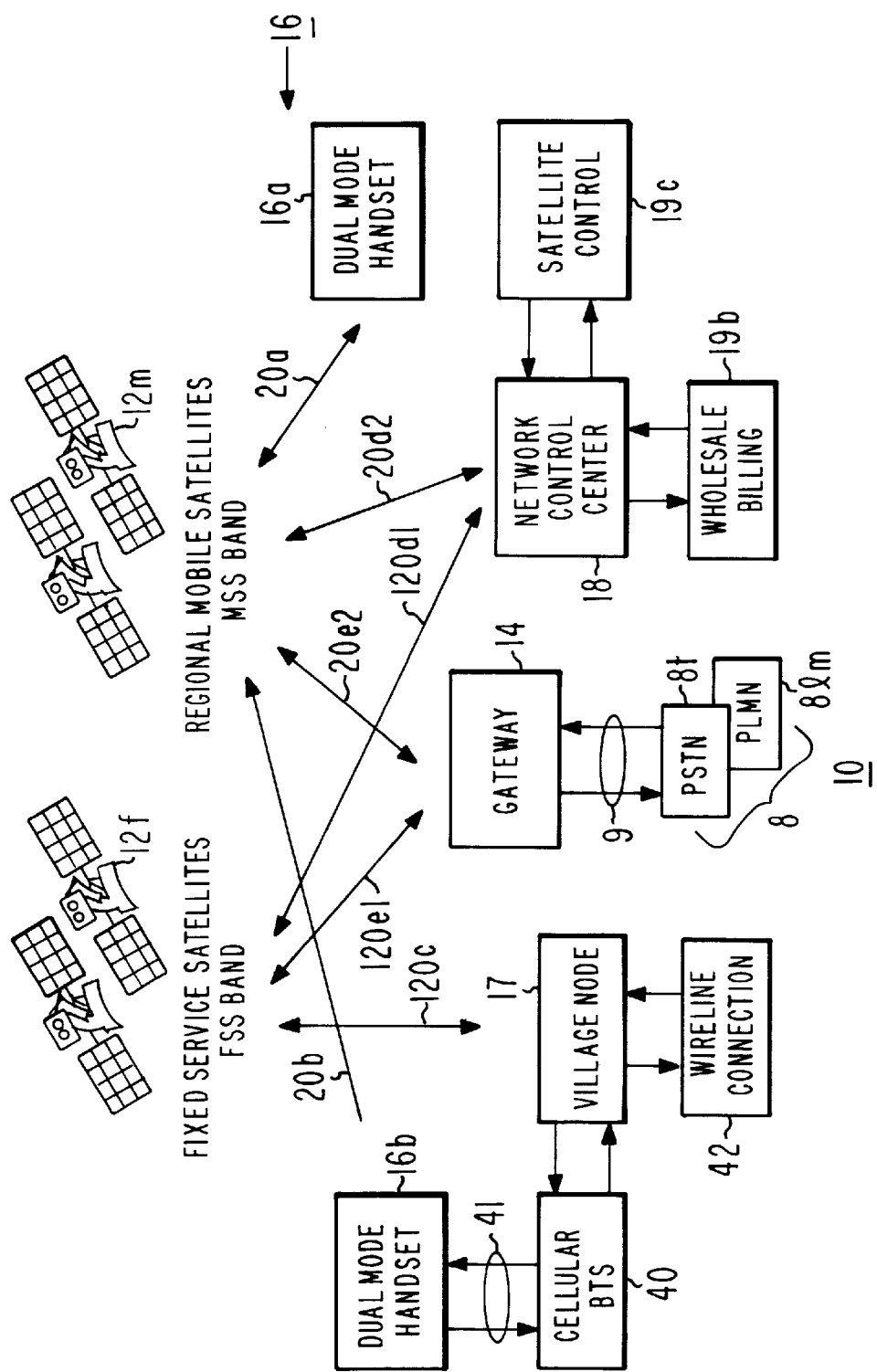
FIG. 1 is a simplified block diagram of a communication system according to an aspect of the invention including mobile and fixed services.

FIG. 1 is a simplified block diagram of a spacecraft-based communication system 10 according to the invention. In FIG. 1, communication system 10 includes one or more fixed service geosynchronous communication spacecraft or satellites 12$f$ operating in a frequency range suitable for fixed-service communication, and one or more mobile service geosynchronous communication satellites 12$m$ operating in a frequency range suitable for mobile-service communication. The frequency band associated with the fixed satellite 12$f$ may be any allocated fixed satellite service (FSS) band, but higher frequencies such as C- or Ku-band are preferred in order to achieve the required antenna gain while keeping the size and cost of the village terminal antennas small. Two frequency bands are associated with the mobile satellite 12$m$. The frequency band associated with the mobile service which is provided to user terminals may be any allocated mobile satellite service (MSS) band, but lower frequencies, such as L- or S-band are preferred in order to reduce the cost of user terminal equipment. The frequency band associated with the mobile satellite 12$m$ for service to gateways may be an FSS band. Naturally, as technology advances, the considerations which drive the selection of frequencies may change, resulting in other frequency selections.

In FIG. 1, the fixed-service satellite 12$f$ communicates, over a signal path 120$e$1 in a broad antenna beam, with a terrestrial gateway 14, which is representative of all gateways in the system. Gateway 14 is at a fixed site, and is connected by land lines 9 to one or more public switched telephone networks (PSTN) 8$t$ or public land mobile network (PLMN) 81$m$, illustrated together as 8. Similarly, fixed-service satellite 12$f$ communicates, over a signal path 120$d$1 within the broad antenna beam of the fixed-service satellite 12$f$, with a network control center 18. Network control center (NCC) 18 coordinates the operation of both the fixed-service side and the mobile-service side of communications system 10; in system 10, the fixed-service side is controlled through satellite 12$f$, while the mobile side is controlled through satellite 12$m$. The NCC participates in initial call set-up, and allocates frequency resources for both the fixed and mobile systems among the gateways. The NCC also provides a central location at which billing information is collected from gateways and village terminals, as suggested by block 19$b$. Network control center 18 also interfaces with a satellite control facility (SCF) illustrated as a block 19$c$. The satellite control facility 19$c$ receives requests from the NCC for satellite payload reconfiguration. These commands, along with normal spacecraft housekeeping commands, are sent by the satellite control center 19$c$ to the fixed satellite 12f and the mobile satellite 12m. The satellite control facility 19c also receives and processes telemetry information from both satellites.

Network control center 18 is illustrated as being separate from gateway 14 and satellite control center 19c in FIG. 1, but economic considerations may dictate that the NCC, SCF, and a gateway be collocated to allow sharing of a common antenna and RF subsystem.

Mobile-service satellite(s) 12m of FIG. 1 provides communication by way of a plurality 20 of separate antenna spot beams, some of which are illustrated as 20a and 20b, with terrestrial user terminals 16a and 16b, respectively, of a set of user terminals 16. The user terminals may be of any type, but in general are lightweight, hand-held, battery-powered transceivers, used for telephony. In general, such transceivers will have small, low-gain antennas such as whip antennas, but they may have other types of antennas. There is no particular requirement that the user terminals actually be mobile, and such terminals may be fixed in location and/or powered from the local power line, but the user terminals are generally used by system subscribers, rather than by system operators. Of course, system operator personnel may make use of such user terminals, too. While the user terminals are termed "terrestrial," this should be understood in relation to the location of the satellites; a "terrestrial" terminal for purposes of this invention may be on a moving vehicle, possibly even on an aircraft, although commercial airlines generally do not permit the use of cellular telephones during operations.

Mobile service satellite(s) 12m of FIG. 1 also communicates by way of a single broad coverage antenna beam 20d2 with the NCC 18, SCF 19c, and all gateways 14. The broad coverage beam 20d2 allows the satellite 12m to receive and transmit control signals, and to route user and control traffic through the gateways.

As so far described, the system of FIG. 1 is similar in overall concept to the system described in a U.S. patent application Ser. No. 08/916,600, filed Aug. 22, 1997 in the name of Hudson, and entitled *SPACECRAFT CELLULAR COMMUNICATION SYSTEM*.

The fixed service satellite 12f of FIG. 1 provides communication by way of one, or at most a few, broad beam(s), rather than by way of hundreds of spot beams, to the village terminals or nodes of system 10 which are represented by village terminal 17 of FIG. 1. The same broad beam(s) are used to provide communication between the fixed satellite 12f and NCC 18, SCF 19c, and gateways 14.

Village terminal 17 of FIG. 1 is representative of many such terminals, which are located in villages far from other infrastructure, which would be difficult to connect to land lines. Such villages could be served by a gateway terminal connecting to the local public switched telephone network. However, it would be costly to provide a full-service gateway at each such location. Thus, according to an aspect of the invention, the village terminal 17 lacks at least the home and visitor registers which would be found in a gateway terminal, and the system services for the villages are provided by the gateways to which they connect. Also, villages which are far from basic infrastructure are likely to be without a public switched telephone network. Consequently, according to an aspect of the invention, the village terminal 17 not only lacks certain aspects of the gateway terminals, but it also includes a wireless "land" connection to those user terminals within its range, as suggested in FIG. 1 by the block 40 labeled "cellular BTS," where "BTS" stands for "base transceiver station. The cellular system represented by block 40 may include multiple cells in the region about the village, or it may have only a single cell. The wireless cellular system 40 communicates with those of the user terminals 16 which lie within its effective range, as suggested by the signal paths 41 connecting wireless cellular system 40 with representative user terminal 16b.

In accordance with a further aspect of the invention, at least some of the user terminals 16 of the system are capable of operating in two distinct modes of operation. In a first mode of operation, the user terminal 16b communicates by way of the cellular system 40 with the village terminal 17. By way of example, a user terminal, such as 16b of FIG. 1, which lies within the effective range of a cell of cellular system 40, and is therefore within the effective range of village terminal 17, requests service from the cellular system 40 in well-known manner, such as that used in conjunction with a GSM cellular system, by requesting access to a telephone number. The village terminal compares the prefix of the desired telephone number with a memorized or stored list of prefixes which are in its service area. If the desired prefix is within the ambit of the village terminal, the call is routed over either an associated land wireline 42 to the appropriate number, or over the cellular system 40. On the other hand, if the prefix of the desired telephone number is not in the region which is local to the village terminal, the village terminal routes the message by way of a signal path 120c in the broad beam to the fixed service satellite 12f, from which it can be routed to an appropriate one of the gateways or other village terminals for further forwarding. It should be noted that, in FIG. 1, signal paths 120e1, 120d1, and 120c are all within a single broad beam of the fixed service satellite 12f.

If a dual-mode user terminal 16b is located out of range of any village terminal 17, as for example user terminal 16a of FIG. 1, it senses the lack of local or village service, and reverts to a mode of operation in which it communicates with system 10 by way of that spot beam 20a of mobile-service satellite 12m within which it happens to be located. The communication with satellite 12m in a mobile mode of operation is known, as for example from the abovementioned Schiavoni, Hatzipapafotiou, and Hudson patent applications.

Figure 2:
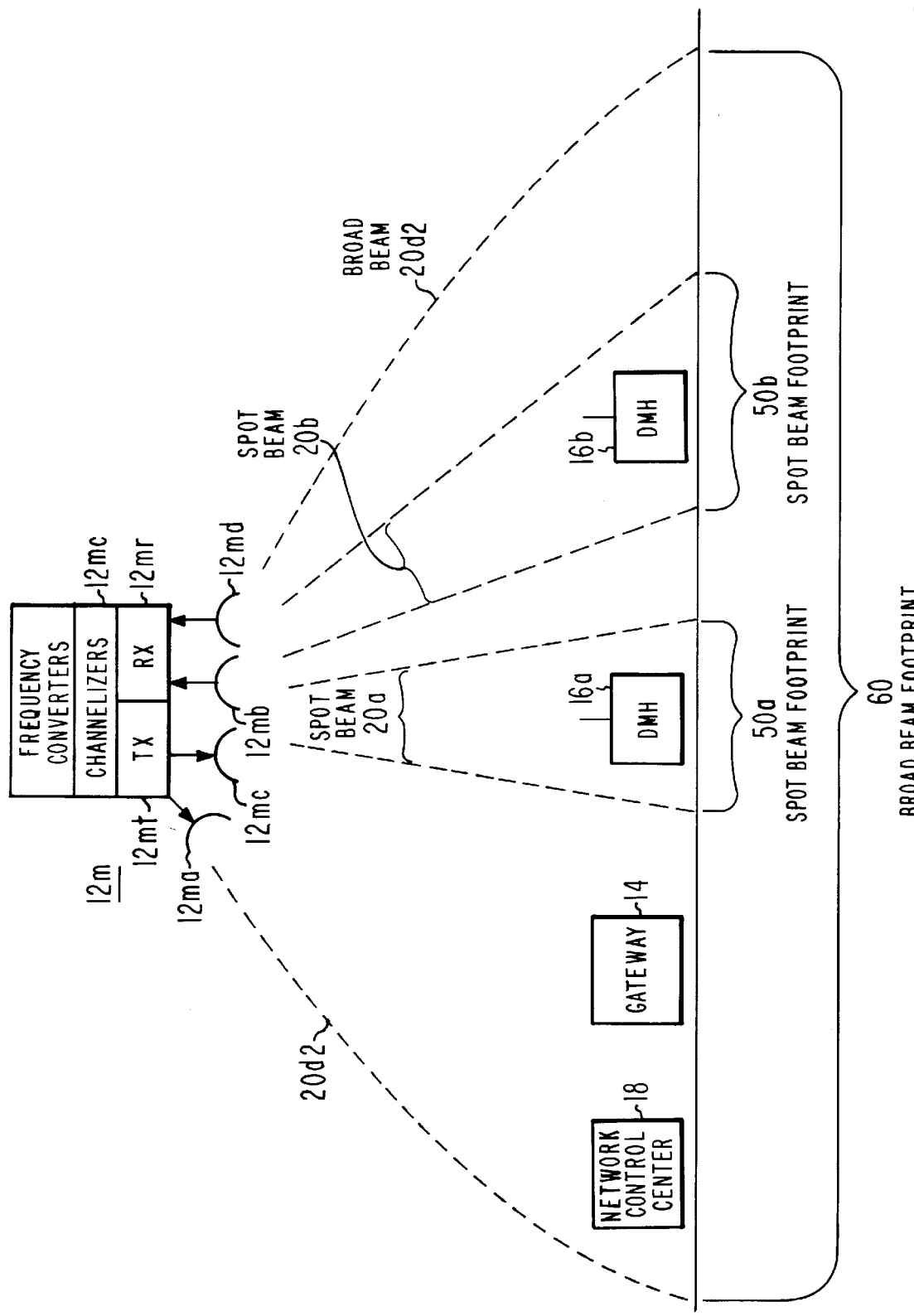
FIG. 2 is a simplified block diagram illustrating the mobile-service aspect of the arrangement of FIG. 1.

FIG. 2 illustrates the routing of signals through the mobile service satellite 12m. Satellite 12m includes four effective antennas, namely transmit antennas 12ma and 12mc, and receive antennas 12mb and 12md. Transmit antenna 12ma produces multiple spot beams, such as spot beams 20a and 20b, pointed in different directions, for transmitting signals to user terminals within the various spot beams. Receive antenna 12mb produces multiple spot beams that are congruent with the beams produced by antenna 12ma. Receive antenna 12mb is used to receive signals from user terminals within the various spot beams. Each spot beam produces a footprint on the Earth's surface, illustrated in FIG. 2 as 50a for spot beam 20a, and as 50b for spot beam 20b. Transmit antenna 12mc produces a broad coverage beam 20d2 to transmit to the gateways, NCC, and SCF. Receive antenna 12md produces a broad coverage beam that is congruent with the beam produced by antenna 12mc. Receive antenna 12md is used to receive signals from the gateways, NCC, and SCF. The footprint associated with transmit antenna 12mc and receive antenna 12md is illustrated as 60.

Signals received from mobile user terminals through antenna 12mb may be routed directly on board the satellite to other mobile user terminals through transmit antenna 12ma, or the signals may be routed to gateways or the NCC through transmit antenna 12mc. In a similar fashion, signals received from the gateways or the NCC through receive antenna 12md may be routed to other gateways through transmit antenna 12mc or to mobile user terminals through transmit antenna 12ma. The NCC and SCF coordinate to configure the satellite to provide the appropriate frequency-based signal routing. Frequency converters on-board the satellite 12m provide the appropriate frequency translations between the frequency bands used by the four effective antennas 12ma, 12mb, 12mc, and 12md. The NCC and SCF also control the frequency translations on-board the satellite 12m.

Figure 3:
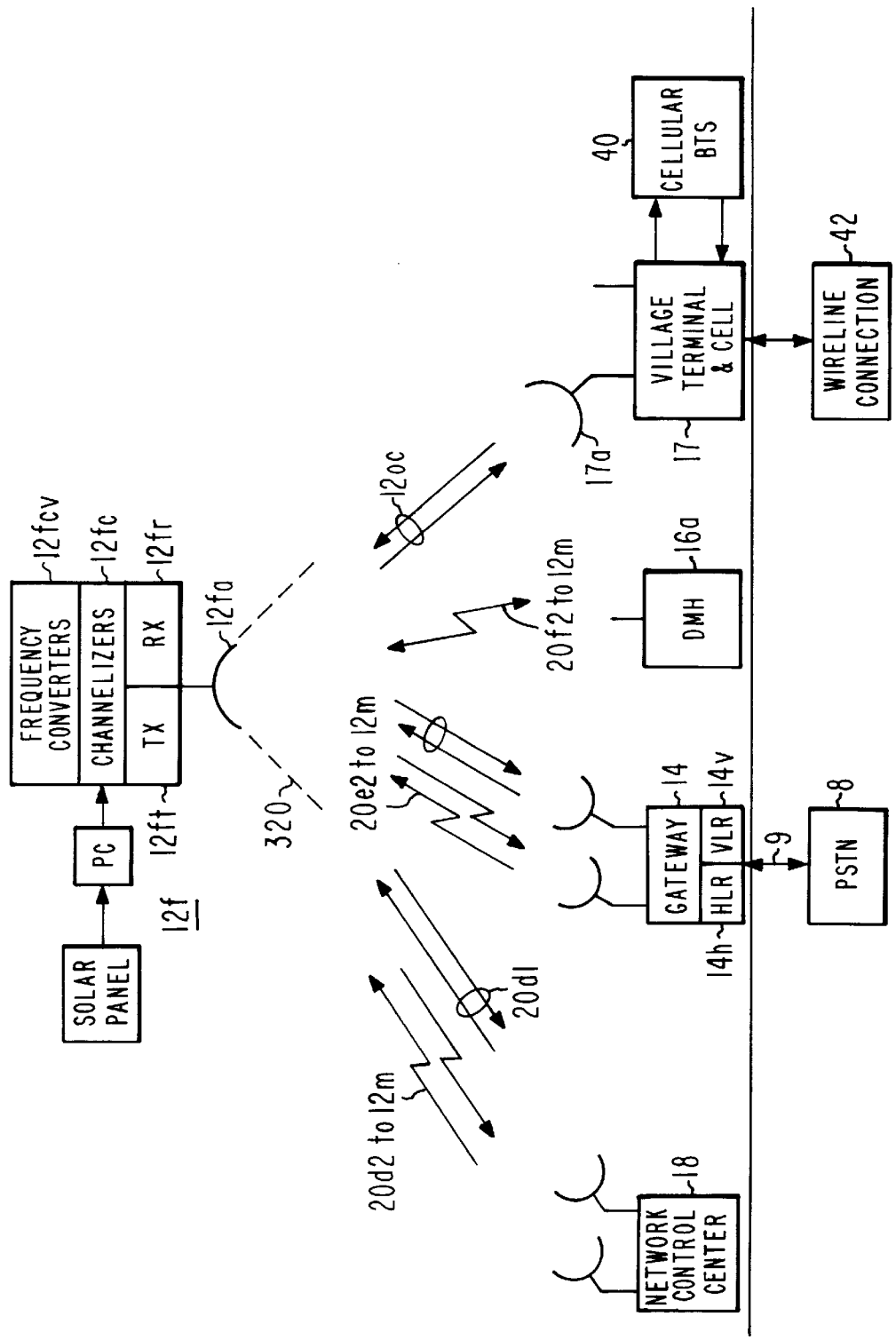
FIG. 3 is a simplified block diagram of the fixed-service portion of the arrangement of FIG. 1.

FIG. 3 is a simplified diagram of the fixed-service portion of the communication system 10 of FIG. 1. In FIG. 3, fixed-service satellite 12f does not necessarily include a channelizer or beamformer. The only requirement is that the fixed-service satellite be a simple bent-pipe repeater. Satellite 12f includes an antenna 12fa which produces a single broad beam, or at most a few broad beams, represented by dash lines 320, over the entire region being served. Antenna 12fa is connected to a receiver (RX) 12fr and to a transmitter (TX) 12ft. Signals received by antenna 12fa and receiver 12fr are coupled by way of frequency channelizers 12fc to a bank of frequency converters 12fcv, in which the carrier frequencies are converted in controlled or specified manners, detailed below. The frequency-converted carriers are coupled through channelizers 12fc (and beamformers, not illustrated, if necessary), and from the channelizers the signals are applied to either a single powerful transmitter or amplifier, or to banks of individual transmitters illustrated as a TX block 12ft. Thus, uplink signals within the frequency range of receivers 12fr are converted to downlink frequencies and transmitted on downlinks.

The home location register (HLR) 14h of FIG. 3 is a database located at the gateway 14 that contains information relevant to the provision of telecommunication services for each subscriber that is registered with the gateway 14. The HLR 14h maintains this information regardless of whether the subscriber is completing calls through his home gateway or another gateway. The HLR also contains information relative to the subscriber location, such as the mobile satellite spot beam number or the fixed satellite village terminal identifier with which the user terminal is currently associated. The HLR may also contain an authentication center that is a functional subdivision that provides management of security data for the authentication of subscribers.

The visitor location register (VLR) 14v is a database located at each gateway that provides temporary storage of subscription data for those subscribers currently completing calls through the gateway.

The village terminal or transceiver 17 consists of antenna and RF equipment 17a for communications with the fixed satellite 12f. It also contains equipment for local call switching and control, as well as call record capabilities. The village transceiver includes a wireless communication loop 40 to provide communications services over a limited area. The wireless local loop could be implemented as one or multiple cells of a land-based cellular communications system. The village transceiver may optionally contain equipment to interface with a local PSTN or PBX (private branch exchange) 42 if required. Maintaining the HLR and VLR databases at a gateway assigned to the village terminal minimizes the cost and complexity of the village terminal. In addition to this advantage, some of the telecommunications required control functions are provided at the remote gateway to minimize the performance requirements of the village terminal controller.

The dual mode phones 16 select between the terrestrial or satellite mode of operation in the manner described below. The user can configure the dual-mode phone to begin operation in either the satellite or terrestrial mode of operation upon power-up. If the terrestrial mode is selected, the handset, when first powered, searches a set of predefined frequency channels for a broadcast message from the terrestrial wireless local loop (WLL) system 40. If a broadcast message is detected, the dual-mode handset commences operation on the terrestrial WLL system. If the handset does not detect a broadcast message from the terrestrial WLL system, then the user is given the option to switch the dual-mode phone to the satellite mode. If the satellite mode is selected, the phone searches for a broadcast message on predefined frequencies associated with the mobile satellite system 12m. In the satellite mode of operation, as long as the user terminal is within the coverage area of the mobile satellite and the user terminal transmission to, or reception from the mobile satellite is not blocked, the user terminal connects with the mobile satellite system 12m. Once the phone has registered with either the terrestrial WLL 40 or the mobile satellite 12m, it will use the system with which it is registered to receive incoming calls and to place outgoing calls.

Figure 4:
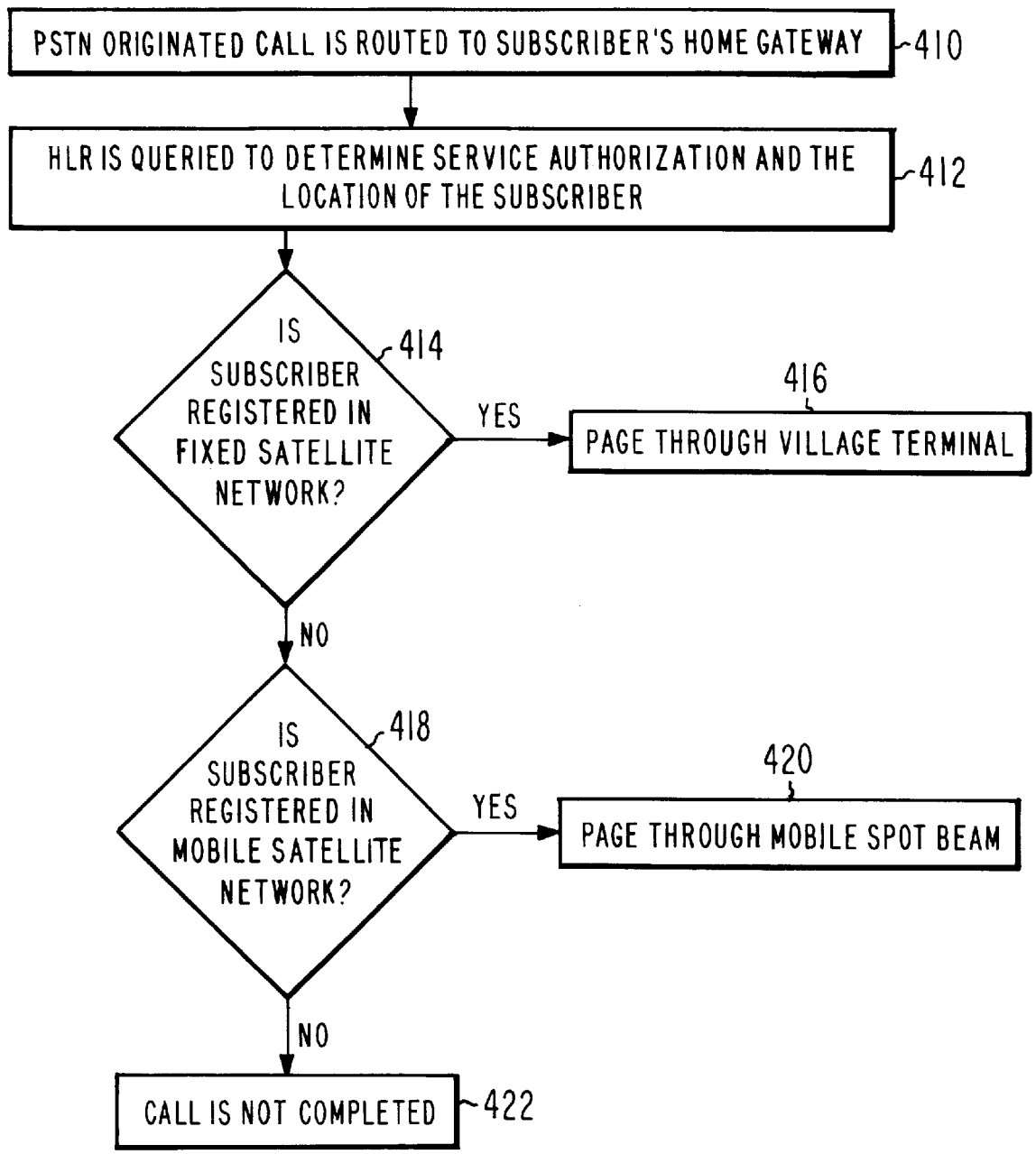
FIG. 4 is a simplified flow chart illustrating the way a call from a public switched telephone network is processed.

FIG. 4 is a flow chart illustrating the processing associated with telephone calls originating from a land service or PSTN. In FIG. 4, a block 410 represents the routing of a PSTN originated call to the subscriber's home gateway: this function is accomplished by the PSTN itself, since each gateway has an "area code", and all subscribers having the given gateway as a "home" gateway have that gateway's "area code" prefix. A PSTN call to a user terminal never terminates at a gateway: PSTN calls to the subscriber's home gateway are sent to the subscriber either through the FSS satellite and a village terminal, or from the MSS satellite directly to the user terminal. From block 410, the logic of the processing flows to a block 412, which represents querying the home location register (HLR) to determine if the subscriber being called is a paying subscriber, and to determine his location. From block 412, the logic flows to a decision block 414, which routes the logic by a YES path to a further block 416 if the called subscriber is registered (presently believed to be located in) the fixed satellite network. Block 416 represents paging the called subscriber in the appropriate village terminal. If the called subscriber is not registered with the fixed satellite network, the logic leaves decision block 414 by the NO path, and arrives at a further decision block 418. Block 418 routes the processing by way of a YES output to a further block 420 if the called subscriber is registered to the mobile satellite network. Block 420 represents paging the called subscriber through a mobile satellite network spot beam. If, on the other hand, the called subscriber is not on the mobile satellite network either, the system has no means to access the called subscriber, so the logic flows to a block 422, which represents non-completion of the call, which may be implemented, for example, by playing a recording to the caller stating that the called person is not available through the system 10.

Figure 5:
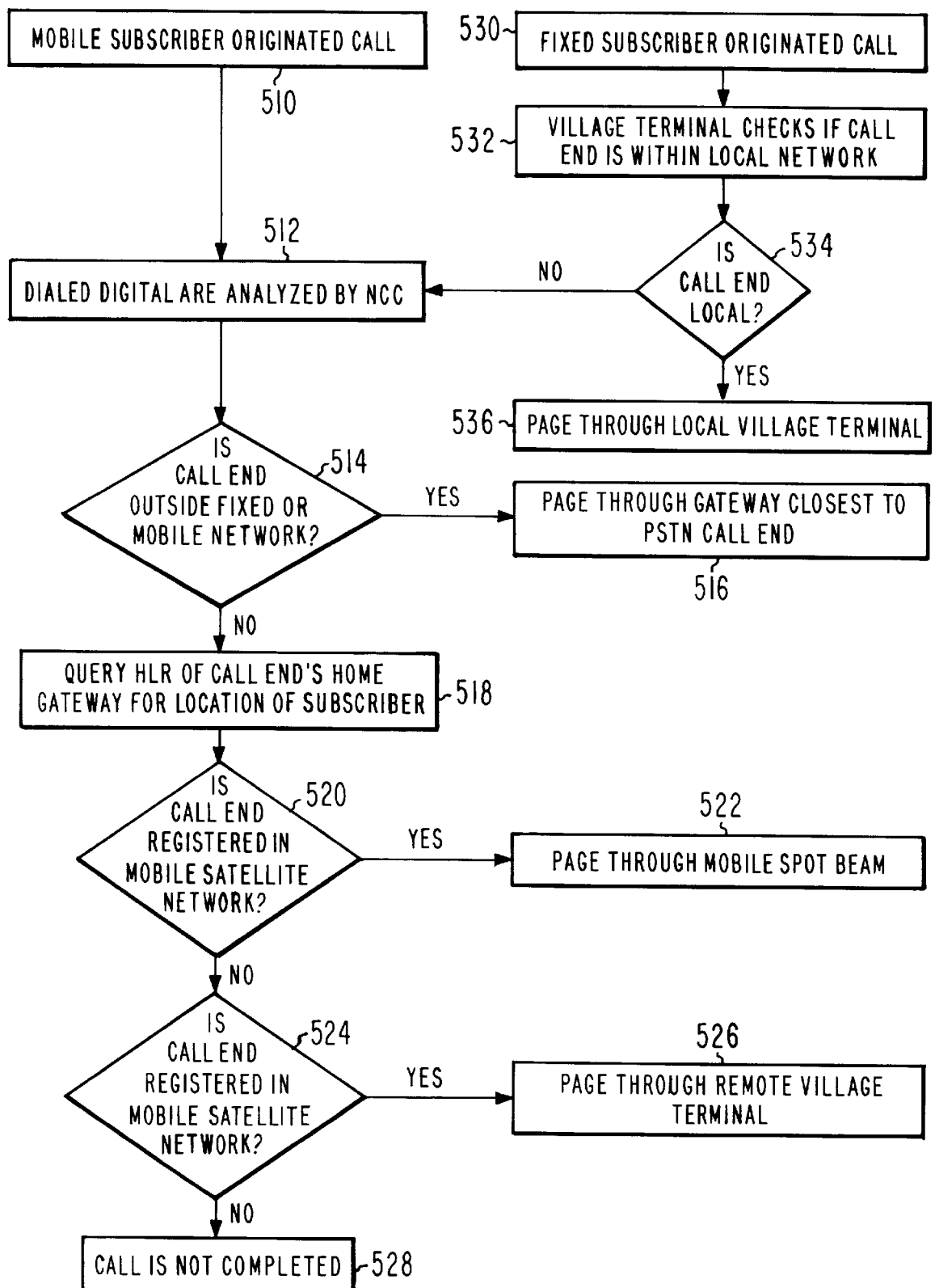
FIG. 5 is a simplified flow chart illustrating the way a call originating from a subscriber is processed.

In the other direction, a mobile subscriber or a fixed subscriber may place a call, as suggested by blocks 510 and 530, respectively, of FIG. 5. From block 510, the processing logic flows to a block 512, representing analysis of the dialed digits by the network control center (NCC), to determine if the call is being placed to a called party who is within the communication system 10 including the fixed satellite system or the mobile satellite system. If the call is placed to a location outside of the communications system 10, the called party is paged through that one of the gateways which is closest in connection to the PSTN called end, as suggested by block 516. In this context, "closest in connection" means the shortest, least complex, or cheapest connection path, rather than closest in linear distance. If the called party is within the communication system 10, the logic leaves decision block 514 by the NO output, and proceeds to a block 518. Block 518 represents a query directed to the called party's home gateway, which, as mentioned above, is known from the prefix or "area code" portion of the telephone number, to determine the last registered "present location" of the called party. From block 518, the logic proceeds to a decision block 520, which represents a routing of the logic by way of the YES output of the decision block to a block 522 if the called subscriber is registered on the mobile satellite network. Block 522 represents paging of the called subscriber through the appropriate spot beam of the mobile service satellite.

If the called subscriber is not registered with (or in) the mobile satellite network in the flow chart of FIG. 5, the logic leaves decision block 520 by way of the NO output, and proceeds to a further decision block 524, which represents an evaluation of whether the called subscriber is registered with the fixed satellite network. If so, the logic flows to a block 526, representing paging through the fixed satellite network to the appropriate village terminal. On the other hand, if decision block 524 finds that the called subscriber is not in the fixed satellite network, the logic is routed by way of the NO output to a block 528, representing non-completion of the call.

If a subscriber makes a call over the fixed satellite network, as represented by block 530 of FIG. 5, the logic of the call processing flows to a block 532, representing an evaluation by the village terminal of the called number to determine if it is within the local calling area of the village terminal itself. The logic flows to a decision block 534, which routes the logic by a NO output to block 512 of FIG. 5 if the call is not local, and by way of the YES output to a block 536 if the call is local. Block 536 represents placing of the call page through the village terminal. Routing of the logic to block 512 causes the processing to proceed as described above, through the logic described as following block 512.

Thus, according to the invention, a spacecraft-based cellular frequency- and time-division multiple access communication system (10) provides communication among terrestrial user or subscriber terminals (16), terrestrial gateway terminals (14), and terrestrial village terminals (17). The communication system (10) comprises a satellite-based first transceiver (12*m*) arrangement. The first transceiver (12*m*) arrangement includes a first frequency-dependent routing arrangement (12*mc*), a first transmitting arrangement (12*mt*), a first receiving arrangement (12*mr*), and an antenna arrangement (12*ma*, 12*mb*, 12*mc*, 12*md*) coupled to the transmitting (12*mt*) and receiving arrangements (12*mr*). The antenna arrangement (12*ma*, 12*mb*, 12*mc*, 12*md*) includes a first antenna (12*ma*) which forms a plurality of spot beams (20*a*, 20*b*) directed toward the Earth's surface, each in a different direction, so that each beam overlies a different terrestrial footprint (50*a*, 50*b*), and a second antenna (12*mb*) which produces at least one broad beam directed toward the Earth's surface. The first transceiver (12*m*) arrangement is at least for (a) receiving, over the broad beam, forward traffic signals transmitted within a first uplink frequency band (C) from at least one of the gateway terminals (14), and for frequency shifting the forward traffic signals to a first downlink frequency band (L), and for retransmitting the forward traffic signals in the first downlink frequency band (L) over at least one of the spot beams (20*a*, 20*b*) to at least some of the user terminals (16) lying within the footprint (50*a*, 50*b*) of the one of the spot beams (20*a*, 20*b*), and for (b) receiving, over at least one of the spot beams (20*a*, 20*b*), return traffic signals transmitted within a second uplink frequency band (L, which happens to be the same as the second downlink frequency band) from at least one of the user terminals (16) lying in the footprint (50*a*, 50*b*) associated with that one of the spot beams (20*a*, 20*b*), and for frequency shifting the return traffic signals to a second downlink frequency band (C, which happens to be the same as the first uplink frequency band), and for retransmitting the return traffic signals in the second downlink frequency band (C) over the broad beam (20*d*2) to at least some of the gateway (14) lying within the footprint (60) of the broad beam. As a consequence, the first transceiver (12*m*) operates in a bent-pipe manner to provide communications between the user terminals (16) on the one hand and the gateway (14) on the other hand. The communication system (10) also includes a satellite-based second transceiver arrangement (12*f*). The second transceiver arrangement operates in a bent-pipe manner for providing communications among the fixed stations, namely the village terminals (17) and gateway terminals (14), and does not provide communication directly with the user terminals (16). The communication system (10) includes at least one terrestrial gateway terminal (14), which includes subscriber home (14*h*) and visitor (14*v*) registers, for storing information about communication system (10) subscribers. Each of the gateway terminals (14) is coupled to at least one public network (8), which may be one of a public switched telephone network (8*t*) and a public land mobile (81*m*) network. Each gateway terminal (14) provides communication, by way of the second transceiver arrangement (12*f*), between the public network (8) and others of the gateway terminals (14) and the village terminals (17). The communication system (10) also includes at least one terrestrial village terminal (17). The village terminal (17) provides communication by way of the second transceiver (12*f*) arrangement with at least one of the gateway terminals (14). The village terminal (17) differs from the gateway terminals (14) in that it lacks the subscriber home location register (14*h*) and the subscriber visitor register (14*v*). A further distinguishing characteristic of a village terminal according to an aspect of the invention is that it includes at least one cell of a wireless land-based cellular communication system (40) having a limited effective range. The cell or cells of the village terminal wireless system (40) is for providing communications among those of the user terminals (16) within the effective range of the cell of the wireless system (40) of other village terminals (17), and, by way of the second transceiver arrangement (12*f*), between at least one of the gateway terminals (14) and those of the user terminals (16) within the effective range of the cell of the wireless system (40) of the village terminal (17). The communication system (10) also includes at least one terrestrial dual-operating-mode user terminal (16*a*, 16*b*). When the dual-operating-mode user terminal (16*a*, 16*b*) is within the effective range of the cell of the wireless system (40) of the village terminal (17), the user terminal (16*a*, 16*b*) operates in a first mode, by which communications are made between the dual-operating-mode user terminal (16*a*, 16*b*) and the village terminal (17) by way of the wireless system (40), and, when the dual-operating-mode user terminal (16*a*, 16*b*) is not within range of any cell of a wireless system (40) of a village terminal (17), operating in a second mode, by which the dual-operating-mode user terminal (16a, 16b) communicates with the first transponder arrangement (12m). As a result, in the first operating mode, the dual-operating-mode user terminal (16a, 16b) may communicate with others of the user terminals (16) within the range of the wireless system (40) of the village terminal (17) by way of the village terminal, and in the second operating mode, the dual-operating-mode user terminal (16a, 16b) communicates with others of the user terminals (16) by way of at least the first transceiver (12m), and whereby, in the first operating mode, the dual-operating-mode user terminal (16a, 16b) communicates with the gateway terminals (14) by way of the village terminal (17) and the second transceiver (12f), and in the second mode of operation, the dual-operating-mode user terminal (16a, 16b) communicates with one of the gateway terminals (14) by way of the first transceiver (12m).

In a particular embodiment of the invention, the communication system (10) has the first (12m) and second (12f) transceivers located on first and second satellites, respectively. The preferred orbit of the satellite(s) is geosynchronous.

Other embodiments of the invention will be apparent to those skilled in the art. For example, while the transceivers have been described as being mounted on different satellites, they may be mounted on the same satellite. While the user terminals have been described as mobile, it makes no difference if some of the user terminals are at fixed locations, or if they are used with an antenna dedicated to communication with the spacecraft.

What is claimed is:

1. A spacecraft-based cellular frequency- and time-division multiple access communication system for communication among terrestrial user terminals, terrestrial gateway terminals, and terrestrial village terminals, said communication system comprising:

a satellite-based first transceiver arrangement, said first transceiver arrangement including a first frequency-dependent routing arrangement, a first transmitting arrangement, a first receiving arrangement, and an antenna arrangement coupled to said transmitting and receiving arrangements, which antenna arrangement includes a first antenna which forms a plurality of spot beams directed toward the Earth's surface, each in a different direction, so that each beam overlies a different terrestrial footprint, and a second antenna which produces at least one broad beam directed toward the Earth's surface, said first transceiver arrangement being at least for (a) receiving, over said broad beam, forward traffic signals transmitted within a first uplink frequency band from at least one of said gateway terminals, and for frequency shifting said forward traffic signals to a first downlink frequency band, and for retransmitting said forward traffic signals in said first downlink frequency band over at least one of said spot beams to at least some of said user terminals lying within said footprint of said one of said spot beams, and (b) for receiving, over at least one of said spot beams, return traffic signals transmitted within a second uplink frequency band from at least one of said user terminals lying in the footprint associated with that one of said spot beams, and for frequency shifting said return traffic signals to a second downlink frequency band, and for retransmitting said return traffic signals in said second downlink frequency band over said broad beam to at least some of said gateway terminals lying within said footprint of said broad beam, whereby said first transceiver operates in a bent-pipe manner to provide communications between said user terminals on the one hand and said gateway terminals on the other hand;

a satellite-based second transceiver arrangement, said second transceiver arrangement operating in a bent-pipe manner for providing communications among said village and gateway terminals, and not with said user terminals;

at least one terrestrial gateway terminal including subscriber home and visitor registers, for storing information about communication system subscribers, each of said gateway terminals being coupled to at least one public network, which public network may be one of a public switched telephone network and a public land mobile network, for providing communication, by way of said second transceiver arrangement, between said public network and others of said gateway terminals and said village terminals, and by way of said first transceiver arrangement, between said public network and said user terminals;

at least one terrestrial village terminal, said village terminal providing communication by way of said second transceiver arrangement with at least one of said gateway terminals, said village terminal differing from said gateway terminals in that said village terminal lacks said subscriber home location register and said subscriber visitor location register, and said village terminal further differing from said gateway terminals in that each said village terminal includes at least one cell of a wireless land-based cellular communication system having a limited effective range, said cell of said village terminal being for providing communications among those of said user terminals within said effective range of said cell of said village terminal, and, by way of said second transceiver arrangement, between at least one of said gateway terminals and those of said user terminals within said effective range of said cell of said village terminal; and at least one terrestrial dual-operating-mode user terminal, for, when said dual-operating-mode user terminal is within said effective range of said cell of said village terminal, operating in a first mode by which communications are made between said dual-operating-mode subscriber terminal and said village terminal, and, when said dual-operating-mode terminal is not within range of any village terminal, operating in a second mode by which said dual-operating-mode user terminal communicate with said first transponder arrangement, whereby, in said first mode, said dual-operating-mode user terminal may communicates with others of said user terminals within said range of said village terminal by way of said village terminal, and in said second mode, said dual-operating-mode user terminal communicates with others of said user terminals by way of at least said first transceiver, and whereby, in said first mode, said dual-operating-mode user terminal communicates with said gateway terminals by way of said village terminal and said second transceiver, and in said second mode of operation, said dual-operating-mode user terminal communicates with one of said gateway terminals by way of said first transceiver.

2. A system according to claim 1, wherein said first and second transceivers are located on first and second satellites, respectively.

3. A system according to claim 2, wherein said first and second satellites are in geosynchronous orbits.

* * * * *

UNITED STATES PATENT AND TRADEMARK OFFICE
CERTIFICATE OF CORRECTION

PATENT NO. : 5,907,541
DATED : 5/25/99
INVENTOR(S) : Daniel Wayne Fairholm et al.

It is certified that error appears in the above-identified patent and that said Letters Patent is hereby corrected as shown below: On the title page: Item [75]

Inventors: Daniel Wayne Fairholm, Dennis Clifton Whitaker, and James Richard Diercks (name omitted from printed patent)

Signed and Sealed this

Ninth Day of November, 1999

Attest:

Q. TODD DICKINSON

*Attesting Officer*     *Acting Commissioner of Patents and Trademarks*